F. J. COLE.
FERTILIZER DISTRIBUTER.
APPLICATION FILED DEC. 16, 1913.
1,095,383.
Patented May 5, 1914.
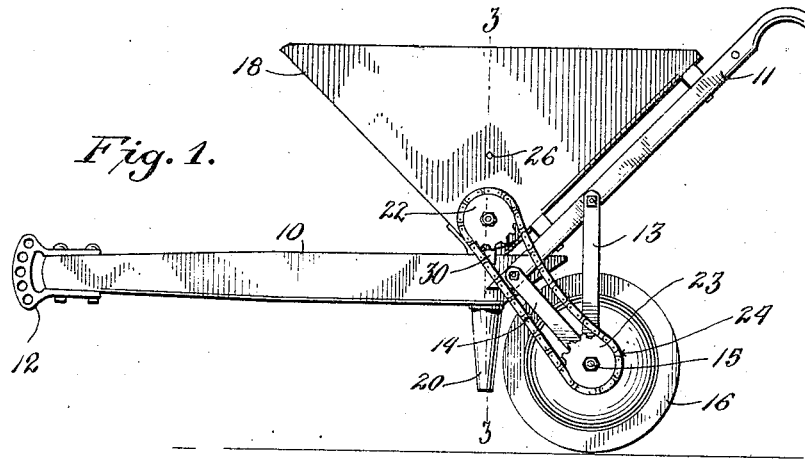
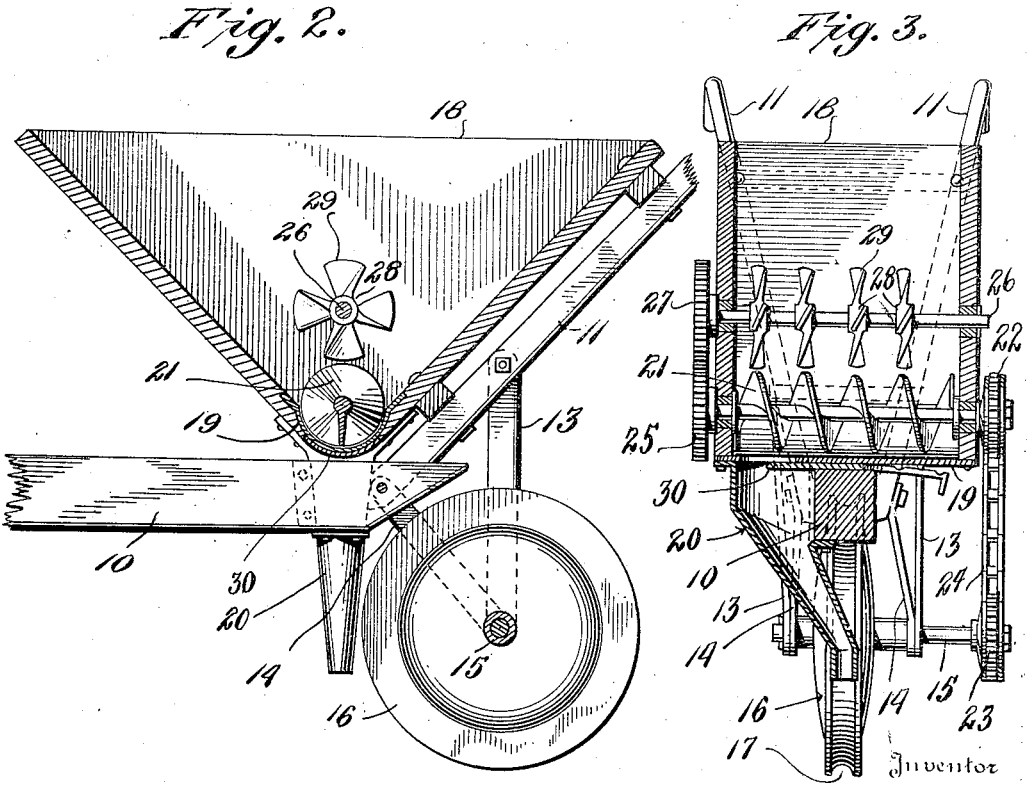
Inventor
F. J. Cole
By Henry T. Bright
Attorney

UNITED STATES PATENT OFFICE.

FRED J. COLE, OF PRESCOTT, ARKANSAS.

FERTILIZER-DISTRIBUTER.

1,095,383.

Specification of Letters Patent.

Patented May 5, 1914.

Application filed December 16, 1913. Serial No. 806,959.

*To all whom it may concern:*

Be it known that I, FRED J. COLE, a citizen of the United States, residing at Prescott, in the county of Nevada, State of Arkansas, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer distributers.

The object of the invention resides in the provision of a fertilizer distributer which will produce an even feed of the material during the operation of the device and which embodies means for moving the material in the hopper transversely of the latter at the bottom thereof and additional means disposed above the first named means for moving the material in the hopper oppositely to the movement imparted thereto by the first named means, said second named means also serving to induce a violent agitation of the material in the hopper to effect an efficient mixing of such material.

A further object of the invention resides in the provision of a fertilizer distributer which will be simple in construction, efficient in use, and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a fertilizer distributer constructed in accordance with the invention; Fig. 2, a vertical section of the invention; and Fig. 3, a section on the line 3—3 of Fig. 1.

Referring to the drawings the improved fertilizer distributer is shown as comprising a beam 10 carrying at its rear end controlling handles 11 and at its front end a clevis 12 for the ready attachment of draft animals. Depending from the handles 11 respectively are brackets 13 and 14 in the lower ends of which is rotatably mounted a shaft 15. Fixed on the shaft 15 centrally of the beam 10 is a traction wheel 16 having a grooved periphery 17. Supported upon the handles 11 and the beam 10 in a suitable manner is a hopper 18 the bottom of which is constituted by a trough 19 extending transversely of the hopper. Depending from one side of the hopper is a delivery spout 20 which is directed inwardly toward the beam 10 so as to deliver directly in advance of the wheel 16. Journaled in the sides of the hopper 18 and extending through the trough 19 is a conveyer or feed screw 21 which has one end of the core thereof extended through the side of the hopper and fixed on this extended end of the core of the feed screw is a sprocket wheel 22 which alines with a sprocket wheel 23 fixed on the shaft 15. Traveling on the sprocket wheels 22 and 23 is a sprocket chain 24 whereby the rotation of the wheel 16 will effect a rotation of the feed screw 21, the pitch of said screw being such that the aforementioned rotation thereof will move material in the bottom of the hopper transversely of said hopper in the direction of the delivery spout 20, thus assuring an even feed of material from the hopper into the delivery spout and also obviating the possibility of the material becoming clogged within the hopper. The end of the core of the feed screw 21 remote from the sprocket wheel 22 is also extended through the hopper and has fixed thereon a gear 25 for a purpose that will presently appear. Journaled between the sides of the hopper 18 above the screw 21 is a shaft 26 which has the end thereof adjacent the gear 25 extended through the side wall of the hopper and fixed on this extended end of the shaft 26 is a gear 27 whereby the rotation of the feed screw 21 will effect an opposite rotation of the shaft 26. Fixed upon the shaft 26 at spaced intervals are hubs 28 from which radiate blades 29. The pitch of the blades 29 is such that when the shaft 26 is rotated oppositely to the feed screw 21 they will effect a movement of the material in the hopper opposite to the movement of material induced by the feed screw 21. In addition to effecting a movement of the material as before mentioned the blades 29 also serve to violently agitate the material and efficiently mix same. Owing to the material moving and mixing effect of the blades 29 it is rendered possible when the material in the hopper is almost exhausted, to supply new material in the form of its separate ingredients, the moving and mixing effect of the blades 29 assuring complete mixing of the material before same is delivered into the delivery spout by the conveyer screw 21. Passage of material from the hopper to the delivery spout may be controlled through the medium of a sliding gate valve 30.

What is claimed is:—

In a fertilizer distributer, the combination of a beam, a hopper supported by the beam and having at one side a depending discharge spout, a feed screw rotatably mounted in the bottom of the hopper for moving material transversely of the hopper into the discharge spout, a shaft rotatably mounted in the hopper above the feed screw, a plurality of blades mounted on the shaft each having its longitudinal axis disposed in true radial relation with respect to the shaft and each further having a pitch adapted to move material oppositely to the feed screw when said shaft is rotated in one direction, and means for rotating said shaft and feed screw to effect opposite movements of material in the hopper.

In testimony whereof, I affix my signature, in the presence of two witnesses.

FRED J. COLE.

Witnesses:
W. V. TOMPKINS,
CHAS. H. TOMPKINS.